Feb. 8, 1938.  R. LINDE ET AL  2,107,335
METHOD OF AND APPARATUS FOR OPERATING COLD ACCUMULATORS
Filed April 17, 1936
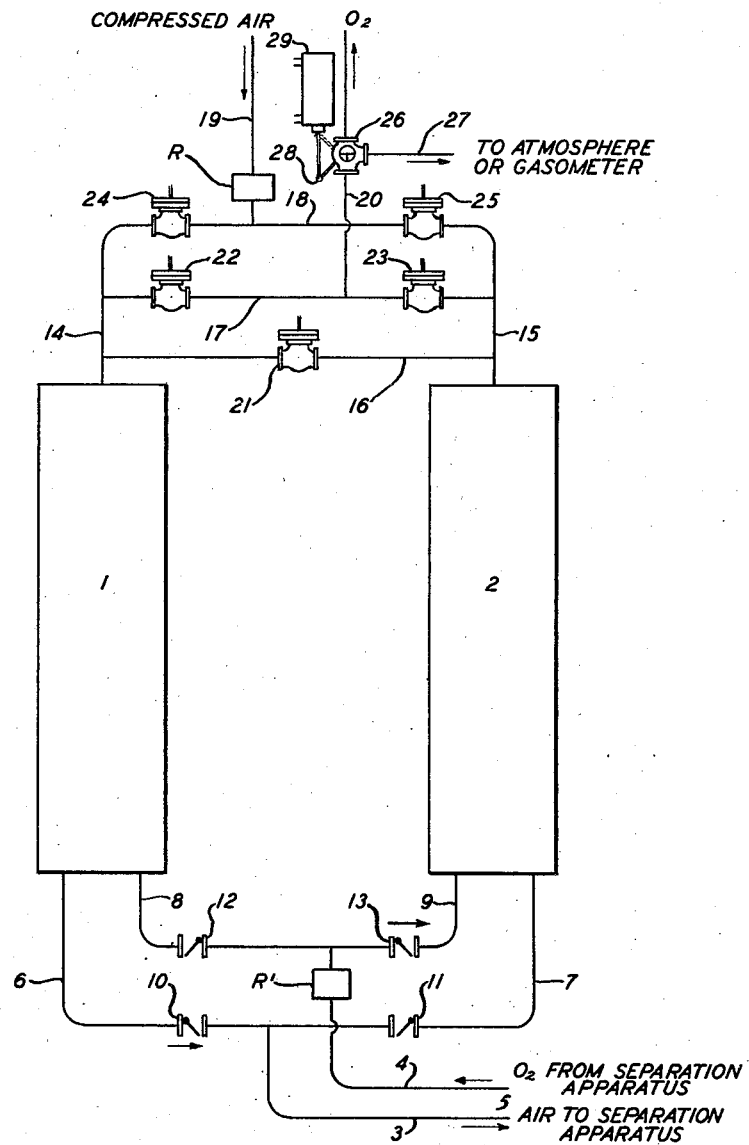
INVENTORS
RICHARD LINDE
CARL P. HOCHGESAND
BY
ATTORNEY

UNITED STATES PATENT OFFICE 2,107,335

METHOD OF AND APPARATUS FOR OPERATING COLD ACCUMULATORS

Richard Linde, Munich, and Carl Peter Hochgesand, Solln, near Munich, Germany, assignors to The Linde Air Products Company, a corporation of Ohio Application April 17, 1936, Serial No. 74,940
In Germany May 17, 1935

14 Claims. (Cl. 62—175.5)

This invention relates to a method of and apparatus for controlling the flow of gases in cold accumulators and more particularly for the operation of cold accumulators in connection with apparatus for the separation of gas mixtures into their components by liquefaction and rectification.

The general procedure of effecting heat exchange between a mixture to be cooled and the separation product to be reheated by the use of cold accumulators thru which the flow of gas is pediodically alternated, in connection with apparatus for the separation of gas mixtures by liquefaction and rectification, is known. In such arrangements the regenerators or accumulators always operate in pairs, a separation product flowing through one of the pair, while the compressed mixture to be separated flows simultaneously through the other one of the pair in the opposite direction. After a certain period, three minutes for example, the direction of flow of the gas streams to the cold accumulators is exchanged, so that the accumulator in which the separation product was heated then conducts and cools the supplied gas mixture, while the accumulator which previously cooled the gas mixtures gives up absorbed heat to the separation product.

The reversal of the flow to and from the accumulators is usually effected at the end of each period by three-way valves. Such valves were operated by mechanical, electrical, or compressed air actuated means providing the desired actuating impulses at the proper times, the valves being located adjacent the warm end of the accumulators and serving to connect either the gas mixture or separation product conduits with the corresponding accumulator. Adjacent the cold ends of the accumulators it has been generally sufficient to provide check or flap valves in the mixture and separation product conduits which serve for the correct distribution of the cold gases to and from the separation apparatus in accordance with the setting of the valves at the warm ends of the accumulators.

The usefulness of a process for separating gas mixtures utilizing cold accumulators in the manner above described is somewhat impaired by the fact that portions of the initial gas mixture are left in the accumulator at the moment of reversal of flow, and thus become admixed with the portions of the product of separation next passed therethrough, causing a reduction in the purity of the product.

Furthermore, because of the pressure difference between the compressed mixture and the separation product, some of the mixture appears in the separation product during the operation of the reversal apparatus as well as through the quantities of gas that remain in the accumulators. This causes a loss of compressed gas as well as the contamination of the separation product. The losses of compressed gas and the contamination of the separation products become greater with increasing pressure differences between the mixture and the separation product, and even with a difference of only a few atmospheres, such losses reach appreciable values.

The principal object of the present invention is to provide a method and an apparatus for controlling the flow of gases into and out of cold accumulators in such a manner that the losses and the contamination of the products are reduced to immaterial amounts.

The above and other objects and the novel features of the invention will be apparent from the following description and the accompanying drawing, such drawing being a diagrammatic view in elevation of an exemplary apparatus for controlling the flow of gases into and out of cold accumulators according to this invention.

In accordance with the invention, the reversal of the accumulators is not accomplished by means of three-way valves such as are usually employed, but preferably there are provided, in the individual conduits adjacent the warm ends of the accumulators, single stop valves or separately operated flow control means. The reversal of flow of the gases is accomplished in such a manner that: first, the initial supply of fresh gas mixture and separation product to the accumulators is shut off before permitting the gases to flow in the reverse direction, equalization of pressures is effected by opening connecting passages between the two accumulators. After pressure equalization has occurred, the connecting conduit between the accumulators is closed and the valves which cause the gas mixture and the separation product to flow through the accumulators in the reverse direction are opened. Finally, in accordance with the invention, the accumulator through which the separation product now flows is briefly opened to communication with the atmosphere or a region of relatively low pressure, at its warm end at the start of this period of the cycle of operation, so that any mixture remaining in the same does not enter into the conduit for the separation product but preferably is blown off into the atmosphere or into a storage gasometer for holding the mixture to be separated, the mixture being swept out or displaced by the separation product entering from the cold end.

In the drawing, two cold accumulators 1 and 2, of the usual type, are shown which effect the desired heat exchange between air and oxygen flowing to and from an air separation apparatus which separates air into oxygen and nitrogen by liquefaction and rectification. The separation apparatus may be of any known type and is not shown for the sake of clearness of the drawing. Apparatus of this general type is disclosed in United States Patent No. 1,890,646 issued December 13, 1932. The cold accumulators usually are filled with a structure which has a large surface, a large heat storage capacity, and a porosity that permits a free flow of gas therethrough. This structure may be damaged if it is subjected to the effects of a too rapid increase in gas flow. Conduits 3 and 4 lead to and from the separation apparatus at 5. The lower or cold ends of the accumulators 1 and 2 are connected to conduit 3 by branch conduits 6 and 7, respectively, and to conduit 4 by branch conduits 8 and 9, respectively. Check or flap valves are provided in each of these branch conduits,—valves 10 and 11 in branches 6 and 7 permitting flow only in the direction out of the accumulators into the conduit 3, and valves 12 and 13 permitting flow only in the direction from the conduit 4 into the accumulators. A flow rate controller or resistance R' may be interposed in the conduit 4.

Conduits 14 and 15 communicate with the upper or warm ends of the accumulators 1 and 2 and are joined by a cross or equalizing conduit 16 and by two connecting conduits 17 and 18. The mixture to be separated, such as compressed air, is conducted from the compressing apparatus through a conduit 19 to a point about midway between the ends of conduit 18; and the oxygen product of the separation is conducted to suitable oxygen-receiving or consuming apparatus through a conduit 20 which communicates with the mid portion of conduit 17. The conduit 19 may be provided with a flow rate controller or resistance R to prevent excessive rates of flow of gas into the accumulators. Stop valves are provided in the several conduits as follows: Valve 21 controls the equalizing conduit 16; valves 22 and 23 control the flow of gas out of accumulators 1 and 2, respectively, to conduit 20; and valves 24 and 25 control the admission of compressed air to the accumulators 1 and 2, respectively.

A three-way valve 26, interposed in conduit 20, has a side outlet which communicates with a conduit 27 open to the atmosphere or, if desired, opening into a gas receiver or gasometer. The valve 26 is provided with an operating lever 28 which may be operated by actuating mechanism 29, such as a compressed air-operated mechanism. The valves 21, 22, 23, 24, and 25 may also be motor operated, preferably by compressed air; and the air impulses to these valves and to the mechanism 29 are timed to occur at proper periods to effect the desired cycle of operation.

To describe the operation of the apparatus: it may be assumed that valves 21, 22, and 25 are closed; that valves 23 and 24 are open; and that air flows downwardly through the accumulator 1 and oxygen flows upwardly through the accumulator 2. Valve 26 is so regulated that, with its lever 28 in the upward position, the oxygen passing through conduit 20 flows to the oxygen receiver. The check valves 10, 11, 12, and 13 adjust themselves in accordance with the pressures in the conduits controlled by the valves at the warm ends of the accumulators in such a manner that valves 10 and 13 are open and valves 11 and 12 are closed.

After a period of three minutes, for example, the accumulators are to be reversed; that is, air is to be passed through accumulator 2 and oxygen through accumulator 1. This reversal is accomplished in the following manner in accordance with the invention: First, valves 23 and 24 are closed so that the flow of gas through the accumulators is stopped. Then, prior to opening the valves 22 and 25 which will permit flow in the new direction, communication is first established between the two accumulators by opening the valve 21. By this equalization of pressure in the accumulators, approximately one-half of the air in the accumulator 1, after closing the valves 23 and 24, flows over into accumulator 2 and effects a partial filling of the latter with air. If this equalization were not effected, this portion of the already compressed air would remain in accumulator 1 and would thus be lost to the separation process, and in addition would mix with and contaminate the oxygen which flows through accumulator 1 in the subsequent flow period. Following the pressure equalization between the accumulators, which requires a period of approximately one second, valve 21 is closed and the renewed flow of air and oxygen to the accumulators is now effected by opening the valves 22 and 25. Prior to, or substantially simultaneously with the opening of valve 22, the three-way valve 26 is adjusted to connect conduit 20 with conduit 27 which leads to the atmosphere. The result of the step of blowing down to the atmosphere is that the balance of the air remaining in accumulator 1, following the pressure equalization between the two accumulators, is washed out of the accumulator by the oxygen entering at its cold end, and thus the oxygen cannot be contaminated. As soon as the oxygen has advanced to a point close to valve 26, this valve is again set back to its normal position, cutting off flow to the conduit 27 and allowing flow through the conduit 20 to be resumed.

The closing of the valves should be effected as quickly as possible in order to make the time required for reversal as brief as possible. However, when starting the air and separation product to flow at the end of the reversal period, it is advisable to reduce the velocity of gas flow through the valves to the accumulator by means of resistance or by a special construction of the valve cross-section or similar means, in order that: Firstly, the pressure impulses received by the accumulators from the compressed gas are made as mild as possible; secondly, that mixing of the air remaining in an accumulator with the entering separation product is avoided for the purpose of effecting better washing out of the air. Flow rate controllers R, R' may be used to this end.

While the process and apparatus are described above as applied to the reversal of accumulators for accomplishing heat exchange between air and oxygen in the separation of air, this invention can be similarly utilized for the reversal of accumulators which effect heat exchange between any given gas mixture and one of its separation products. It will be obvious that various changes may be made in the details of the hereindescribed process and apparatus without departing from the principles of this invention or sacrificing its advantages.

What is claimed is:

1. A method for controlling the flow of gas in a pair of cold accumulators which comprises causing two gases under different pressures to flow in opposite directions in said pair for a desired period of time the one gas flowing from the warm portion to the cold portion of one of said pair, and the other gas flowing from the cold to the warm portion of the other of said pair; stopping said flows at the end of said period; effecting a transfer of gas from the accumulator having the higher pressure to the other of said pair until the pressures therein are substantially equalized; and causing the resumption of flow in opposite directions in said pair to begin a new period of operation whereby the gas so transferred is not lost.

2. A method for controlling the flow of gas in a pair of cold accumulators which comprises causing two gases under different pressures to flow in opposite directions in said pair for a desired period of time, the one gas flowing from the warm portion to the cold portion of one of said pair, and the other gas flowing from the cold to the warm portion of the other of said pair; stopping said flows at the end of said period; effecting a transfer of gas from the accumulator having the higher pressure to the other of said pair until the pressures therein are substantially equalized; releasing gas to a region of relatively low pressure from the warm portion of a selected one of said pair immediately after said transfer; and causing the resumption of flow in said pair to begin a new period of operation in an opposite direction whereby the gas so transferred is not lost with the gas released.

3. A method for controlling the flow of gas in a pair of cold accumulators which comprises causing two gases under different pressures to flow in opposite directions in said pair for a desired period of time, the one gas flowing from the warm portion to the cold portion of one of said pair, and the other gas flowing from the cold to the warm portion of the other of said pair; stopping said flows at the end of said period; effecting a transfer of gas from the accumulator having the higher pressure to the other of said pair until the pressures therein are substantially equalized; causing the resumption of flow for beginning a new period of operation to be started gradually whereby said accumulators are relieved of the shock of a sudden increase of pressure.

4. A method of operating a pair of periodically reversible cold accumulators, each having a warm portion and a cold portion, which comprises passing a gas through one accumulator from the warm portion to the cold portion thereof; passing another gas, at a different pressure, through the other accumulator from the cold portion to the warm portion thereof; interrupting the flow of said gases at the end of a predetermined period of time; substantially equalizing the pressures of the gases in said accumulators by transferring gas from one accumulator to the other accumulator; then passing gas in a reverse direction through each of said accumulators; again interrupting the flow of the gases at the end of a predetermined period of time; and again substantially equalizing the pressures of the gases in said accumulators by transferring gas from one accumulator to the other accumulator.

5. A method of operating a pair of periodically reversible cold accumulators as claimed in claim 4, in which the flow of said gases is suddenly interrupted at the end of each period of flow, and the reverse flow of the gases is started gradually.

6. A method for operating a pair of periodically reversible cold accumulators having relatively warm and cold portions which comprises causing a flow of one gas from the warm to the cold portion through one of the accumulators and a flow of another gas from the cold to the warm portion through the other accumulator for a desired period of time, said gases having different pressures; stopping said flows at the end of said period; substantially equalizing the pressures of the gases in said accumulators by transferring gas from the accumulator containing gas under higher pressure to the other accumulator; and causing a resumption of gas flow in the reverse directions to begin gradually.

7. A method for operating a pair of periodically reversible cold accumulators having relatively warm and cold portions which comprises causing a flow of one gas from the warm to the cold portion through one of the accumulators and a flow of another gas from the cold to the warm portion through the other accumulator for a desired period of time, said gases having different pressures; stopping said flows at the end of said period; substantially equalizing the pressures of the gases in said accumulators by transferring gas from the accumulator containing gas under higher pressure to the other accumulator; releasing gas to a region of relatively low pressure from the warm portion of the first-named accumulator; and causing a resumption of gas flow in the reverse directions to begin gradually.

8. A method for operating a pair of periodically reversible cold accumulators having relatively warm and cold portions which comprises causing a flow of one gas from the warm to the cold portion through one of the accumulators and a flow of another gas from the cold to the warm portion through the other accumulator for a desired period of time, said gases having different pressures; stopping said flows at the end of said period; releasing a volume of gas substantially equal to the volume of the first-named accumulator from the warm portion thereof to a region of relatively low pressure; and causing the resumption of flows in the reverse direction to begin gradually.

9. Apparatus for controlling the flow of gas in cold accumulators which comprises the combination with a pair of cold accumulators having cold and warm portions, of means for admitting gas selectively to the warm portions of both of said accumulators, outlet means for conducting gas out of both of said accumulators, means for conducting cold gas to and from the cold portion of said accumulators, and means for effecting equalization of pressure between such accumulators by a flow of gas from one to the other during a period when such admission means and outlet means are closed.

10. Apparatus as claimed in claim 9, including means for releasing gas to the atmosphere from the warm portion of a selected one of either of said accumulators during a short interval following said flow of gas from one to the other of the accumulators.

11. Apparatus as claimed in claim 9, including means for causing the flow of gas into said accumulators to be resumed gradually.

12. Apparatus for controlling the flow of gas in a pair of cold accumulators having cold and warm portions comprising conduits for conducting a compressed gas mixture to both of said accumulators; conduits for conducting gas out of the warmer portions of said accumulators; means in said first-named conduits for controlling the admission of gas mixture to a selected one of said accumulators; means in said second-named conduits for controlling the flow of gas out of a selected one of said accumulators; and means including a connecting passage between said pair for equalizing the pressure of gases in said accumulators during the interval when said flow controlling means are closed.

13. Apparatus for controlling the flow of gas in a pair of cold accumulators having cold and warm portions comprising conduits for conducting a compressed gas mixture to both of said accumulators; conduits for conducting gas out of the warmer portions of said accumulators; means in said first-named conduits for controlling the admission of gas mixture to a selected one of said accumulators; means in said second-named conduits for controlling the flow of gas out of a selected one of said accumulators; means for effecting a controlled flow of gas from one to the other of said pair; and means for releasing gas to a region of low pressure from a selected one of said pair.

14. Apparatus as claimed in claim 12, including means associated with said flow-controlling means for causing the flow to be stopped suddenly at the end of a normal flow period; and means for causing the admission of gas to said accumulators to be resumed slowly.

RICHARD LINDE.
CARL PETER HOCHGESAND.